April 15, 1958  J. N. GRABER  2,830,808
PULLEY HOLD-DOWN FOR TRAVERSE RODS
Filed May 9, 1957
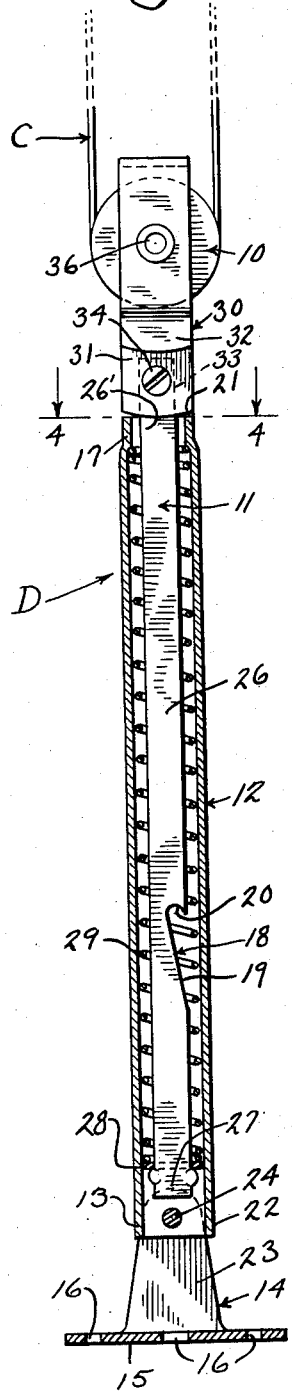
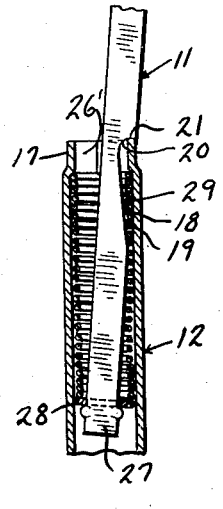
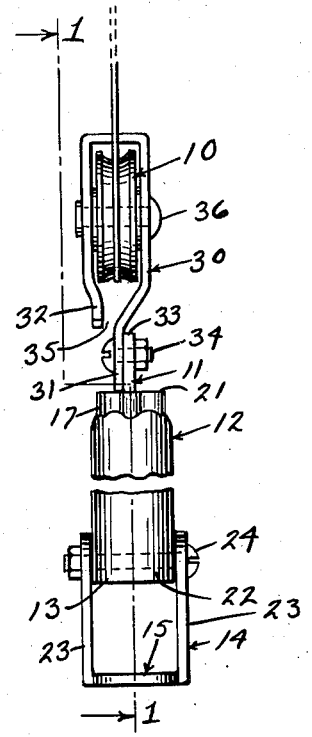
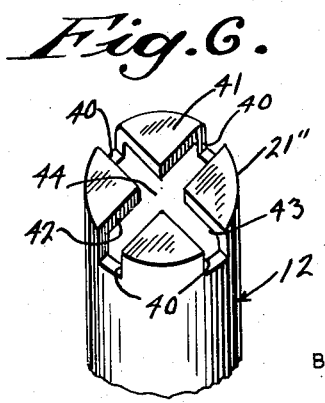
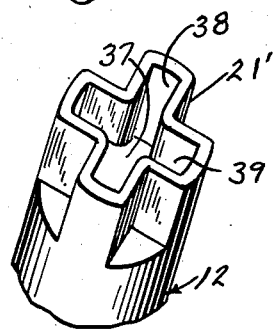
INVENTOR
JOHN N. GRABER
BY
ATTORNEYS

United States Patent Office 2,830,808
Patented Apr. 15, 1958

2,830,808

PULLEY HOLD-DOWN FOR TRAVERSE RODS

John N. Graber, Middleton, Wis., assignor to Graber Manufacturing Company, Inc., Middleton, Wis., a corporation Application May 9, 1957, Serial No. 658,106

6 Claims. (Cl. 267—71)

This invention appertains to pulley hold-downs for traverse rods and, more particularly, to a novel construction in the pulley hold-down for the operating cords of the traverse rods.

In installing custom traverse rods, particularly where the area to be covered by the drapes is fairly large, the operating cord is trained at its lower end about a pulley in lieu of the loose knob ends common to the standard or smaller types of rods.

In the usual construction, the pulley hold-down includes a means for resiliently anchoring the pulley to a base and this structure includes a tube which telescopically receives a rod, on one end of which the pulley is mounted and this rod is under spring tension so that when the drapery operating cord is trained about the pulley, the pulley and rod will be slightly under tension. In the past, the tube housing the rod was provided with a pivoted base and while this affords some adjustment and adaptation to a particular job, in certain instances, it is desirable to have a finer and more complete adjustment and positioning of the pulley. Further, in the past it has been necessary to hold the pulley manually under tension while training the operating cord about the same. Obviously, this requires much manual dexterity and often required the services of more than one man. There has long been a need, in the trade, for a type of pulley hold-down which can readily and easily be installed by one man. This would entail the development of a hold-down which will give a maximum adjustability and adaptability of the pulley to various types of installations and also providing means whereby the pulley can be put under tension and held steady while the operating cord is trained about the same.

Therefore, a primary object of my present invention is to provide a novel pulley hold-down for traverse rods having a fine adjustment of the pulley and providing means for placing the pulley under tension and holding the pulley steady while the operating cord is being affixed thereto, thus, providing a quick and easy installation.

Another important object of my present invention is to provide a pulley mounted on one end of a flat rod, the rod being telescopically received within a housing or outer tube and which rod is under spring tension, means being provided on the rod to hold the same in an elevated position while the operating cord is being trained about the pulley.

A further object of my present invention is to provide a pivoted base supporting means on one end of the outer housing or tube and to form the other end of the tube with guide entrances or ways to receive the flat rod and so that the rod can be turned 90 degrees within the tube from one adjusted position to an alternate adjusted position and held steady in said selected position.

Another object of my present invention is to provide a novel mounting bracket for the pulley wherein one end is left open so that the drapery operating cord may be readily trained about or removed from the pulley after it has been spliced and adjusted to the desired height.

A more specific object of my present invention is to provide a reduced section and hook construction on the flat rod intermediate its ends, so that the rod may be elevated to a position whereby the reduced section is adjacent the upper end of the tube thus enabling the rod to be turned in relation to the tube and also, if desired, the hook construction can be extended over the upper end of said tube to hold the rod steady.

A still further object of my present invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts hereinafter more fully described, illustrated and claimed.

A preferred and practical embodiment of my invention is shown in the accompanying drawing, in which:

Figure 1 is a side elevational view partly in section illustrating one position of my novel pulley hold-down with the drapery operating cord trained about the pulley, the section being represented by the line 1—1 of Figure 3 and looking in the direction of the arrows;

Figure 2 is a fragmentary side elevational view showing the pulley rod in its upper position held steady against the tension of the spring to facilitate the placing of the cord thereon and also showing the reduced sections in position whereby the rod may be turned 90 degrees to another adjustment;

Figure 3 is a fragmentary front elevational view of the pulley hold-down similar to Figure 1 of the drawing;

Figure 4 is a transverse sectional view taken on the line 4—4 of Figure 1 of the drawing looking in the direction of the arrows and illustrating one adjusted position of the pulley rod in full lines and an alternate adjusted position in dotted lines;

Figure 5 is a fragmentary top elevational view of a modified form of the upper end of the housing or tube, and Figure 6 is a top elevational view similar to Figure 5 of the drawing but illustrating a still further modification of the upper end of the housing or tube.

Referring now to the drawing in detail wherein similar reference characters designate corresponding parts throughout the several views, the letter D generally indicates my novel pulley hold-down for the operating cord C of traverse rods. The traverse rods, of course, form no particular part of the present invention and, therefore, has not been illustrated and need not be described. However, it should be noted that the operating cord C operates the slide portions of the traverse rods for opening and closing the drapes and in the usual construction of pulley hold-downs for custom type drapery installations, the pulley 10 is pivotally mounted to a substantially flat elongated rod 11, which rod is telescopically received in the outer tube or housing 12. The lower end 13 of this tube is provided with a pivoted base mounting 14, which base may be secured to the floor or other supporting structures, such as base boards, moldings, wall, etc. and the base fastening plate 15, therefore, is provided with suitable apertures 16 to receive screws (not shown) to secure the hold-down firmly in position. In the usual construction, the upper end 17 of the tube 12 is merely provided with a thin transverse slot and the rod 11 is slidably held therein against turning movement.

It should be noted that it is desirable to hold the rod substantially steady against lateral or turning movement when finally adjusted.

In installing custom drapes, the pulley is first lined up with the proper hang of the cord and the base plate must then be secured to its support with the pulley in its proper lined up position. The cord may then be trained about the pulley and spliced while the pulley is held against spring tension. After the cord is trained about the pulley and spliced, the pulley is released, thus placing the operating cord under spring tension to give a solid feel and custom finish to the installation. Obviously, this required much manual dexterity on the part of the person installing the hold-down and often two workmen were needed, one to hold the pulley in its tensioned position and the other to train the cord about the pulley and splice the same.

A salient feature, therefore, of the present invention is to provide a reduced section 18 in the rod 11, which reduced section performs a dual purpose. This reduced section 18 includes an inwardly extending surface 19 and an upper hook end 20. This upper hook end 20 may be pulled upwardly against spring tension and hooked over the upper end 21 of the tube or housing 12 in the position illustrated in Figure 2 of the drawing. Thus, the pulley will be held steady in an upward position against spring tension and the drapery operating cord can be easily trained over the pulley and adjusted to its proper height. When the hook 20 is moved off of the upper end 21, the rod 11 will then be forced downwardly under spring tension. This, of course, will put the operating cord under tension to give this solid feel and custom finish to the installation.

As previously mentioned, the base portion 14 and its base plate 15 are pivotally secured to the lower end 22 of the tube 12 and this is accomplished by providing a pair of upstanding ears 23 on either side of the base plate 15 through which a pivot bolt 24 extends and this base plate 15 is affixed to any supporting surface depending on the type of installation. While it is true that the base portion 14 may be pivoted backward and forward, there is no side adjustment available and if a side adjustment is needed, the base portion must be turned at an angle. In some instances, this would not be possible or may not be desirable to give a finished appearance to the installation.

Heretofore, the rod 11, while slidable in the tube 12, could not be turned or adjusted relative thereto but was held against lateral movement and, as brought out, it is desirable that the rod 11, when the job is complete, be held against lateral movement. In order to provide, therefore, a more complete and fine adjustment in the installation and positioning of the pulley 10, I form the upper end 21 of the tube 12 with two ways or more to slidably receive the rod 11 and, in one form of the invention, shown in Figures 1 to 4 of the drawing, this is accomplished by reducing the end 21 and pinching in the sides 25 and as shown more particularly in Figure 4 of the drawing, when any portion in the length 26 of the rod 11 is positioned in the end 21 of the tube, the rod 11 is held against turning or lateral movement. However, when the rod 11 is moved to its upper position as illustrated in Figure 2 of the drawing, the reduced section 18 is received in the central opening 26' formed at the end 21 and the rod 11 may be turned at 90 degrees adjustment, from its full line position (Figure 4) to its dotted line position. The rod 11 is then released and it will be held in this adjusted dotted line position against lateral movement by the inwardly directed portions of the side walls 25.

As previously brought out, the mounting of the pulley 10 so that it places tension on the operating cord C is important and this is accomplished by placing a washer or stop element 28 over the end 27 of the rod 11. The end 27 of the rod is then struck-out or provided with nibs for holding the washer or stop element thereon and one end of the spring 29 rests on the upper surface of this stop element while the other end of the spring 29 is received and held by the reduced end portion 21 of the tube 11. Thus, the spring 29 continually urges the rod 11 to its lower position and will place the pulley 10 under tension as above described. In actual practice, the cord C would be adjusted in such a manner that the pulley and rod would be in a somewhat higher and elevated position than is illustrated in Figures 1 and 3 of the drawing.

In most conventional installations, the pulley 10 is mounted on the upper end of the rod 11 by means of a U-shaped bracket, both ends of which are pivotally secured to the rod, thus leaving no opening for the reception of the drapery cord C through the bracket and the cord must be trained about the pulley and then spliced and at the same time the pulley must be manually held in an elevated position against spring tension. In my novel construction, however, the U-shaped bracket 30 has one leg 31 extending considerably beyond the leg 32 and the leg 31 is pivotally mounted to the upper end 33 of the rod 11 through a pivot bolt 34 or the like. This leaves an access opening 35 to the pulley 10, the pulley, of course, being rotatably mounted in the bracket 30 by the pin or axle 36. Thus the cord can be adjusted to a desired height and first spliced before the pulley need be raised to a tensioning level and hooked. The cord being merely slipped through the opening 35 and over the pulley 10, thus lending to the ease of installation and adjustability of the unit. Obviously, the base plate 15 of the base mounting 14 is first secured to the base supporting surface and the pulley adjusted to the necessary angle for the best operation of the drapery cord. This is partly accomplished by turning the rod 11 at various 90 degree angles as previously described.

Obviously, the upper end 21 of the tube 12 may be made any number of ways for the rod 11 but, in the preferred form, I have shown two ways at right angles to one another and, in Figures 5 and 6, I have illustrated two different modifications of the tube end 21. In Figure 5, the end 21' is drawn or pinched inwardly to form a cross shaped opening 37 providing two channels or ways 38 and 39 at right angles to one another to receive the rod 11. The center of the opening 37 is larger than the reduced section 18 of the rod 11 so that the rod may be readily turned to one way or the other.

In Figure 6, the sides of the tube 12 at the end 21" are cut or slotted to provide four slots 40 and the upper ends 41 thereof are bent over at right angles as shown, and this also provides two ways or channels 42 and 43, respectively, extending at right angles to one another as well as a central opening 44 which enables the rod 11 to be moved to alternate adjusted positions.

From the foregoing, it can be seen that I have provided a novel pulley hold-down which is capable of being placed in any of a number of desired positions and which has features enabling the easy installation of the same and it should be understood that various changes in details may be resorted to without departing from the spirit of the invention or the scope of the appended claims.

I claim:

1. A pulley hold-down for traverse rod installations comprising, an elongated hollow tubular housing, a pivoted base secured to one end of said housing for fastening said housing to a support, a flat elongated rod slidably received in said housing having a portion extending outwardly therefrom at the opposite end from said base portion, a reduced section in said rod intermediate its length forming a hook therein, resilient means for continually urging said rod toward said base, and a pulley mounted on the outwardly extending end of said rod for receiving a drapery operating cord.

2. A pulley hold-down for traverse rod installations comprising an elongated hollow tubular housing, a pivoted base portion secured to one end of said housing for fastening said housing to a support, a flat elongated rod slidably received in said housing having a portion extending outwardly therefrom at the opposite end from said base portion, said opposite end of said housing being provided with a central opening so constructed and arranged as to provide at least two ways therein, each way being of a size and configuration to confine said rod against lateral and turning movement, a reduced section in said rod intermediate its length and being of a smaller dimension than the inner dimension of said central opening, whereby said rod may be raised to an elevated position with said reduced section adjacent said central opening and turned out of alignment from one way and into alignment with an alternate way, resilient means for continually urging said rod toward said base end, and a pulley mounted on the outwardly extending end of said rod for receiving a drapery operating cord.

3. A pulley hold-down as set forth in claim 1 wherein said pulley is mounted on the outwardly extending end of said rod by an inverted U-shaped bracket having one leg terminating at a point considerably shorter than the other leg providing an access opening to said pulley.

4. A pulley hold-down as set forth in claim 2 wherein said pulley is mounted on the outwardly extending end of said rod by an inverted U-shaped bracket having one leg terminating at a point considerably shorter than the other leg providing an access opening to said pulley.

5. A pulley hold-down as set forth in claim 1 wherein the opposite end of said tubular housing is provided with at least two ways each of a size and configuration to confine said rod against lateral movement.

6. A pulley hold-down as set forth in claim 2 wherein said reduced section of said rod terminates in a hook.

References Cited in the file of this patent

UNITED STATES PATENTS

| | | |
|---|---|---|
| 906,974 | Wenig | Dec. 15, 1908 |
| 1,171,562 | Timberlake | Feb. 15, 1916 |
| 2,128,030 | Koleno | Aug. 23, 1938 |
| 2,786,522 | Weber | Mar. 26, 1957 |